US006924409B2

(12) United States Patent
Lundtorp

(10) Patent No.: US 6,924,409 B2
(45) Date of Patent: Aug. 2, 2005

(54) METHOD FOR REDUCING THE LEACHING OF OXYANION FORMING ELEMENTS, IN PARTICULAR CHROMIUM, FROM HAZARDOUS WASTE

(75) Inventor: Kasper Lundtorp, Allerød (DK)

(73) Assignee: Babcock & Wilcox Volund APS, Esbjerg (DK)

( * ) Notice: Subject to any disclaimer, the term of this patent is extended or adjusted under 35 U.S.C. 154(b) by 16 days.

(21) Appl. No.: 10/451,083

(22) PCT Filed: Dec. 19, 2001

(86) PCT No.: PCT/DK01/00839

§ 371 (c)(1),
(2), (4) Date: Jun. 19, 2003

(87) PCT Pub. No.: WO02/49779

PCT Pub. Date: Jun. 27, 2002

(65) Prior Publication Data

US 2004/0040914 A1 Mar. 4, 2004

(30) Foreign Application Priority Data

Dec. 19, 2000 (DK) .......................................... 2000 01901

(51) Int. Cl.⁷ ................................................. A62D 3/00
(52) U.S. Cl. ......................... 588/319; 588/256; 588/412
(58) Field of Search ................................ 588/231, 236, 588/242, 249, 256, 319, 404, 412

(56) References Cited

U.S. PATENT DOCUMENTS

| 3,575,853 | A | * | 4/1971 | Gaughan et al. | ............ | 210/667 |
| 3,933,635 | A | * | 1/1976 | Marchant | ..................... | 588/242 |
| 5,431,825 | A | * | 7/1995 | Diel | ........................... | 588/256 |

* cited by examiner

*Primary Examiner*—John Kreck
(74) *Attorney, Agent, or Firm*—Stites & Harbison PLLC; B. Aaron Schulman

(57) ABSTRACT

In a method for reducing the leaching of oxyanion forming elements, in particular chromium, from materials containing environmentally noxious constituents, especially from incineration residues, especially flue gas cleaning products from waste incineration, in particular fly ash, the said materials are admixed with an aqueous medium such as water in a closed container in a liquid-solid ratio sufficient to cause reducing conditions capable of stabilizing oxyanion forming elements, in particular chromium, due to oxidation of metallic Al, Zn, Fe, and other free metals present in the said materials.

22 Claims, No Drawings

METHOD FOR REDUCING THE LEACHING OF OXYANION FORMING ELEMENTS, IN PARTICULAR CHROMIUM, FROM HAZARDOUS WASTE

DESCRIPTION

The present invention relates to a method for reducing the leaching of oxyanion forming elements, in particular chromium, but also e.g. antimony, arsenic, molybdenum, selenium, and vanadium, from materials containing environmentally noxious constituents, especially from waste incineration residues, in particular flue gas cleaning products from incineration, including fly ash. Elements such as chromium, antimony, arsenic, molybdenum, selenium, and vanadium are present in the said residues and products and have hitherto been leached in the form of oxyanions. The present methods for reducing leaching from the said materials are generally not effective towards oxyanion forming elements or will even increase the leaching of these.

In the so-called Ferrox process, which is described in International Application No. PCT/DK97/00350 (WO98/08628), flue gas cleaning products from waste incineration are stabilized. These residue products which are produced in very large amounts have a high content of heavy metals (lead, zinc, chromium, cadmium, etc.) and salts (chloride, sodium, and others), which are easy to wash out, and which can be leached by rainwater seeping through deposits. In the Ferrox process the easily soluble salts are extracted from the residue products, whereas the heavy metals remain in the residue products during stabilization and are bound to the solid phase by the addition of ferrous iron which is oxidized to iron oxides during the process. In the process the heavy metals are Immobilized against leaching due to the binding of the heavy metals to the iron oxides, since iron oxides have a high binding capacity for cations, i.e. positively charged ions. Although the Ferrox process is an extremely attractive and efficient method for obtaining a significant reduction in the leaching of salts and heavy metals from the said residues, the effect on elements which form oxyanions, in particular chromium, is marginal and unsatisfactory.

It is important to realize that air pollution control (APC) residues from waste incineration form an alkaline environment which in the Ferrox process should be preserved to maintain a high buffer capacity against acidification by acid rain and in other ways.

In the Ferrox process it has been possible to reduce the chromium concentration in the process water to a reasonable level, whereas it has not been possible to reduce the leaching of chromium from the final stabilized residue product. Similar problems with respect to chromium are also observed in connection with the other known processes.

Thus, there is a need for an efficient and simple method for reducing the leaching of oxyanion forming elements such as chromium from materials containing environmentally noxious constituents, especially from alkaline waste incineration residues, and in accordance herewith the object of the invention is to fulfill the said need.

In the said residues chromium is assumed to be present primarily in the form of metallic chromium, trivalent chromium and hexavalent chromium. The latter is considered toxic and mobile in view of its solubility in water. Trivalent chromium which is considered the most stable form of chromium is, however, sparingly soluble and will not lead to significant concentrations in aqueous solutions. Metallic chromium is known to be very little reactive.

In view of the fact that the residues comprise reactants and products from the flue gas cleaning process and/or fly ash, these residues have a considerable content of most elements including most of the trace elements. Aluminum as a metallic element will practically always be present in the residues.

It is known from previously performed studies (Oberste-Padtberg, Rüdiger; Schweden, Klaus. Zur Freisetzung von Wasserstoff aus Mörteln mit MVA-Reststoffen. Wasser, Luft und Boden 6, 1990, p. 61–62) that metallic Al can be found in residues from municipal solid waste incineration especially in flue gas cleaning products. In Oberste-Padtberg it is also described how metallic Al and Zn in the residues reacts with water in an alkaline environment and hereby forms $H_2$. This reaction is used in the production of gas concrete where metallic Al powder is added to a mortar for producing the foam-like concrete typical of gas concrete. Any impact on the leaching properties and oxyanion forming elements are not in any way mentioned in Oberste-Padtberg. It is also known that metallic Al can be found in bottom ash from municipal waste Incineration and that formation of $H_2$ occurs when the bottom ash is brought in contact with water.

It has now surprisingly been found that the object of the invention can be attained in a simple, efficient and cheap manner by admixing the materials referred to above with an aqueous medium, preferably water, in a closed container and in a liquid-solid ratio sufficient to cause reducing conditions capable of stabilizing oxyanion forming elements, in particular chromium, due to oxidation of metallic Al, Zn, Fe, and other free metals present in the said materials.

The presence of metallic aluminum and other metals in the residues leads to a reduction of the oxyanion forming elements, e.g. chromium, to a non-leachable form, hereby immobilizing the oxyanion forming elements.

Thus, in its broadest aspect the invention relates to a method for reducing the leaching of oxyanion forming elements, in particular chromium, from materials containing environmentally noxious constituents, especialy from incineration residues, the said method comprising admixing the said materials and an aqueous medium in a closed container in a liquid-solid ratio sufficient to cause reducing conditions capable of stabilizing oxyanion forming elements, in particular chromium, due to oxidation of metallic Al, Zn, Fe, and other free metals present in the said materials.

In particular, if the amount of metallic aluminum in the material or residue is not sufficient, metallic aluminum can be added from an external source; other metals capable of reacting in the same manner as aluminum could also be added.

Hydrogen and/or methane or any other reducing gas can be added from an external source in order to ensure the desired reduction of e.g. hexavalent to trivalent chromium.

A number of preferred embodiments of the invention have been set out in the dependent claims 2 to 19. The advantages connected with these embodiments will be apparent from the present specification, in particular the experimental part.

In EP 0 901 800 A1 there is disclosed a method for reducing the leaching of certain heavy metals from slag or ashes from waste incineration plants by subjecting the slag or ashes to an increased pressure in the presence of an aqueous phase and/or steam. This technique is known as artificial ageing and is intended to reduce pH by a carbonation, which reduces the leachability of many cations e.g. lead, zinc, and cadmium. The only working example in this reference is concerned with the reduction of the amount of lead and zinc, and the only other heavy metals mentioned are cadmium and copper. Chromium is not mentioned at all, and in particular there is no mention of the reduction of hexavalent chromium to trivalent chromium or the concurrent reduction of e.g. As, Mo, Se, and/or V. Furthermore, this reference is silent with respect to taking advantage of aluminum and/or iron present in the waste products with the object of subjecting the said metals to a reaction with in particular chromium.

In NL 9500479 A there is disclosed a method for the treatment of waste incineration residues in an autoclave by means of a gas containing water vapour, whereby the leaching of molybdenum, cadmium and lead is lowered substantially. The method is based on an artificial ageing like in EP 0 901 800. In NL 9500479 A chromium is not mentioned, and as above there is in particular no mention of the reduction of hexavalent chromium to trivalent chromium or the concurrent reduction of e.g. As, Mo, Se, and/or V. Furthermore, this reference does not suggest making use of the content of aluminum and/or iron in the waste products with the object of subjecting the said metals to a reaction with in particular chromium.

In e.g. U.S. Pat. No. 4,033,867 A and U.S. Pat. No. 3,901,805 A the well-known reduction of hexavalent chromium to trivalent chromium in aqueous media is described; the reduction is e.g. carried out with reducing gases such as hydrogen or sulfur dioxide.

Although the prior art comprises several examples of processes in which e.g. hexavalent chromium is reduced to trivalent chromium or even metallic chromium, the concept of the present invention is believed to be novel and unobvious to the average person skilled in the art. Thus, a typical prior art document is U.S. Pat. No. 5,397,478 which, apart from containing a survey of related prior art, concerns a process for the fixation and stabilization of chromium in waste materials comprising the steps of: (a) contacting said waste material in an alkaline aqueous media with a water soluble reducing agent capable of donating electrons in an amount and for a time sufficient to convert a substantial amount of the hexavalent chromium to divalent and trivalent chromium compounds, and (b) contacting the thus treated waste material with a water soluble phosphate source capable of reacting with the divalent and trivalent chromium compounds formed in step (a) in an amount and for a time sufficient to convert a substantial amount of said compounds to non-leachable and stable mineral species, wherein the TCLP (Toxicity Characteristic Leaching Procedure)-chromium levels are decreased below 5 mg/ml.

As will be readily apparent, the latter process is not based on the present, simple and efficient concept of taking advantage of metallic aluminum and other metals present in the treated residue materials by simply adding an aqueous medium such as water, thereby causing the reduction of hexavalent chromium to trivalent chromium as well as the concurrent reduction of other oxyanion forming elements such as As, Mo, Sb, Se, and/or V.

EXPERIMENTAL

The method of the present invention is further illustrated in the following experimental report.

1. Background

In a study of APC-residues leaching properties observations were done, which indicated that the leachability of Cr could be reduced by simply adding water to the dry APC-residue. It was observed that gas formation occurred when water was added to the dry APC-residue in a closed container. Subsequently no Cr leaching could be detected from these residues. The gas was identified as $H_2$ and traces of $CH_4$. It is known from the literature that $H_2$-formation occurs when an anaerobic oxidation of metallic Al and Zn takes place. To verify that the APC-residues have properties (a content of metallic Al or other free metals) that can be utilised for reducing the mobile Cr(VI) into the less leachable Cr(III) and other oxyanion forming elements a series of experiments were initiated. These experiments were, furthermore, designed to reveal if addition of Al from an external source would immobilize Cr. In the following these experiments are described.

2. The Treatment Method

The method is based on utilising the natural content of free metals in APC-residues for immobilisation of Cr, which potentially could be leached out from the residue.

The treatment is done by adding water to the raw residue under anaerobic conditions, e.g. in a closed container. If necessary free metals such as Al(0), Zn(0), or Fe(0) could be added to improve the efficiency. By addition of water in an oxygen free environment an oxidation of free metals such as Al, Zn, and Fe will occur and at the same time Cr and maybe also other oxyanion forming elements will be reduced. The method will as an example reduce Cr from Cr(VI), which is toxic and mobile, to the less soluble and therefore less mobile Cr(III). Thereby the method is beneficial to the environment as the release of Cr in a leaching scenario is reduced compared to a residue which has been handled traditionally, e.g. quenched or humidified under oxygen rich conditions that do not allow a reduction of Cr to take place.

3. Experiment 1

3.1 Experimental Set Up

For this experiment a fly ash from an electrostatic precipitator on the municipal solid waste incinerator I/S Vestforbraending (VF) was used. 600 g VF fly ash was mixed with 444 ml deionized water in a plastic bag for 10 minutes to obtain a homogeneous moist material. Subsequently, the moist residue was transferred into three 100 ml Venoject glasses approximately 75% filled. Afterwards, the air in the glasses was replaced by flushing with nitrogen gas, and each glass was closed with a septum equipped with a gas collecting tube. The gas generated from the moist fly ash was collected into a graduated cylinder immersed under water, making it possible to measure the volume of the gas formation. All glasses were placed in a fume cupboard and shaken every 0.5 hour in the first 6 hours and frequently after 6 hours. The three Venoject glasses (called reactors) were handled differently:

The first reactor was run for 24 hours after being established. The volume of the generated gas was recorded and the gas sample was stored in a 3 ml Venoject glass for gas analysis. Subsequently, leaching tests were performed on the moist residue immediately after the reactor was stopped.

The second reactor was run for 48 hours after being established. The volume of the gas formation was recorded at 2, 4, 6, 24 and 48 hours after start. The gas was sampled and leaching tests were performed as described for the first reactor.

The last reactor was run for 7 days after establishment. The amount of gas generated was recorded after seven days, and the procedures of the gas sample and leaching tests were the same as for the other reactors described above.

In addition to the described reactors 100 g of the moist residue was transferred onto a plastic tray in a very thin layer (approx. 2 mm) in order to maximize oxygen contact with the residue. The residue was kept for one week on the tray and during this period the residue was frequently watered to keep the moisture content. After one week leaching tests were performed on this residue, which had been subdued to humid aerobic conditions.

Two types of leaching tests were used in this experiment to investigate the leaching of Cr. First, a batch leaching test done at a L/S (liquid/solid ratio) of 20 l/kg with mixing by magnetic stirring for 24 hours in an open PE bottle. Second, a batch leaching test done at L/S 20 l/kg with mixing by magnetic stirring for 24 hours in a closed PE bottle. The pH of the samples were measured. The eluate was filtrated by a 0.45 μm filter and acidified prior to Cr analysis.

3.2. Results

Table 1 shows the gas formation and the leaching of Cr versus time. The gas analysis shows that the produced gas primarily consisted of $H_2$, and also a minor part $CH_4$ was detected. Large quantities of gas were found to be generated from the moist residue. After 7 days 3.6 l/kg of gas was generated from the moist residue kept in the reactors. The rate of gas generation varied in the different stages of experiment and was found to be highest during the first 24 hours and decreased in the following 3 days, after which the gas generation almost stopped. Correspondingly, the leaching of Cr (VI) was very low from the moist residues in the reactors (anaerobic conditions). Furthermore, an even lower leaching was found when the leaching test was run in a closed bottle. In contrast, a high leaching of Cr was seen from the exposed residue on the tray regardless of the leaching conditions (open or closed bottles). Comparing the leaching properties, the leaching of Cr from the oxidized residues are 2 or 3 orders of magnitude higher than that of the residues treated under anaerobic conditions. It is likely that the reaction producing the $H_2$ is responsible for the immobilisation of Cr. The gas generation could be due to oxidation of free metals such as Al in an oxygen free environment. The lower Cr leaching in a leaching test done in a closed bottle compared to the test done in a open bottle also suggests that a lack of oxygen is critical for the reduction/immobilization of Cr from the residue.

TABLE 1

Gas generation and leaching of Cr (leaching under aerobic and anaerobic conditions) from a fly ash kept moist under anaerobic conditions versus time.

| Treatment time Hours | Leaching result | | |
| --- | --- | --- | --- |
| | Aerobic mg Cr/kg | Anaerobic mg Cr/kg | $H_2$ generated l/kg |
| 24 | 0.51 | 0.01 | 2.2 |
| 48 | 0.51 | 0.04 | 2.8 |
| 168 | 0.34 | 0.01 | 3.6 |
| Not treated- 168 hours under moist aerobic conditions | 12 | 9.7 | — |

4. Experiment 2

4.1 Experimental Set-up

The purpose of Experiment 2 is to verify that a residue has the capability to reduce Cr due to its natural content of metallic Al and other free metals. Furthermore, addition of metallic Al and Fe to an oxidized residue is studied to verify that addition of these can reduce Cr in a residue under anaerobic conditions. Finally, the stability of the immobilized Cr is examined.

For this experiment a semidry APC-residue taken from a fabric filter at the municipal solid waste incinerator KARA was used. 5 kg semidry residue from KARA (SD) has been sprayed with deionised water and transferred onto a tray in a thin layer for maximum exposure to air for three weeks. During this period, the APC-residue was sprayed with water occasionally and turned around to maximize the oxidation of any natural occuring free metals in the residues. This oxidized semidry APC-residue is named OSD and was sieved before use in the experiment.

To 8 glass bottles with gas tight closure and a septum residue and metals were added as follows:

two bottles with 412 g OSD residue (equivalent to 300 g dry content) and 15 g metallic aluminum (aluminum foil—Al(0)), two bottles with 412 g OSD residues and 10 g granular metallic iron (Fe(0)), two bottles with 412 g OSD, and two bottles with 300 g fresh SD residue Each bottle was then filled with deionized water and closed. $N_2$ was injected into each bottle displacing 1000 ml water from each reactor. After this the liquid/solid ratio in each reactor is approximately 3 l/kg. All reactors were shaken on a roller table during the experiment. The solution and the gas were sampled from the bottles 0, 2½, 7 and 24 hours after being established.

The semidry residue (SD) and oxidized semidry residue (OSD) with the addition of metallic aluminum that had been treated (by addition of water under anaerobic conditions) were used to study the stability of the treated residues. The APC-residues and the supernatant from these two bottles were each split into two parts, respectively, each part representing the content of the bottle it was taken from.

The first part called SD3 and OSD3, respectively, was aerated by stirring in an open air glass vessel for 24 hours in order to subdue the treated residue to a reoxidation.

The second part called SD4 and OSD4, respectively, was kept in a glass container under anaerobic conditions for 48 hours.

After handling each of the parts described were filtrated. Each of the resulting 4 different treated residues (SD3, SD4, OSD3 and OSD4) was then divided into two portions, one which was dried at 50° C. prior to leaching testing and one which was kept wet in a closed container prior to leaching testing.

The 8 different materials were leaching tested by two leaching tests:

A batch leaching test at L/S 20 for 24 hours under aerobic conditions,

A batch leaching test at L/S 20 for 24 hours under anaerobic conditions,

The samples from the leaching test were filtrated by membrane filters with a pore size of 0.45 μm following the pH measurement and then acidified prior to Cr analysis.

4.2 Results

The Cr concentration and the pH in the solution during treatment of OSD and SD residues are shown in Table 2. The figures in Table 2 are average values as each series was made in duplicate.

A high release of Cr (about 400 μg/l) to the solution from the OSD without any added free metals can be seen. This is expected as the OSD residue is fully oxidized prior to this experiment in order to oxidize its content of free metals under aerobic conditions. The OSD therefore serves as a reference to the level of Cr that can be expected leached from traditionally handled residues.

In contrast, the Cr concentrations in the reactors with OSD and metallic aluminum decreased very rapidly and were below 100 μg/l before a first sample could be taken.

The concentration decreased to below the detection limit (2 µg/l) within 2½ hours. Simultaneously, hydrogen formation and a decrease in pH were observed. This result shows that a residue which lacks a natural content of free metals can be added Al(0) from an external source in order to immobilize Cr.

Addition of metallic iron to OSD under anaerobic conditions was also confirmed to be able to immobilize Cr but at a slower rate than metallic Al. This result shows that a residue which lacks a natural content of free metals can be added Fe(0) from an external source in order to immobilize Cr.

In the reactors with fresh SD $H_2$ generation in small quantities was observed concomitantly with a low release of Cr to the water indicating an anaerobic oxidation of free metals such as Al(0) or Zn(0). The concentration of Cr in the water decreased rapidly. This result shows that this fresh SD residue had the capability of reducing Cr by its natural content of free metals if added water under anaerobic conditions as in the suggested treatment method.

TABLE 2

The Cr concentration, the pH in the solution and the $H_2$ generation during treatment in the anaerobic reactors of OSD (with or without addition of Al(0) or Fe(0)) or SD.

| Sample | Addition | Treatment time hours | pH | Cr Conc µg/l |
|---|---|---|---|---|
| OSD | None | 0 | 10.8 | 245 |
| | | 2½ | 11.1 | 427 |
| | | 7 | 11.1 | 442 |
| | | 24 | 11.2 | 343 |
| OSD | Al(0) | 0 | 10.5 | 63 |
| | | 2½ | 9.1 | <2 |
| | | 7 | 9.1 | <<2 |
| | | 24 | 9.2 | <<2 |
| OSD | Fe(0) | 0 | 10.7 | 183 |
| | | 2½ | 11.1 | 189 |
| | | 7 | 11.1 | 114 |
| | | 24 | 11.1 | 6 |
| SD | None | 0 | 12.2 | 36 |
| | | 2½ | 12.0 | <2 |
| | | 7 | 12.0 | <2 |
| | | 24 | 12.0 | <2 |

The water removed during the filtration after the suspension had been aerated (OSD3 and SD3) or just under anaerobic conditions (OSD4 and SD4) was analyzed for Cr. No Cr was found in the water from these filtrations.

To evaluate the stability of the treated residue two of the treated residues were subjected to a further study.

Evaluation of the stability of the treated residues was done by leaching tests on two of the treated residues. The leaching test was performed on:

Treated OSD residue with Al added from an external source,

Treated SD without addition of metals from an external source, and

Untreated raw SD (reference).

The result of the batch leaching tests are shown in Table 3. The leaching tests performed on the untreated SD prior to any treatment serve as a reference, and the results are shown in Table 3. Furthermore, the leaching results of the different treated residues are related to the leaching from the reference (the untreated SD). When a batch leaching test is performed on untreated dry SD under anaerobic conditions Cr will be reduced due to an oxidation of metallic Al and other free metals in the same way as by the described treatment method. Therefore, no improvement can be observed if a leaching test is carried out under anaerobic conditions (these results are not shown). If the leaching test is carried out under oxidized conditions then the treated material has a substantially lower leachability of Cr than that of the untreated SD as shown in Table 3.

TABLE 3

A comparison of the leaching of Cr from treated and untreated SD leached under aerobic conditions.

| Sample | pH | Dried prior to test | Reoxidation | Release µg/kg | Relative to ref. |
|---|---|---|---|---|---|
| Reference-Untreated SD | 12.3 | | | 500 | |
| SD | 12.6 | No | yes | 122 | 24% |
| SD | 12.5 | No | no | <<40 | <<8% |
| SD | 12.6 | Yes | yes | <<40 | <<8% |
| SD | 12.7 | Yes | no | 166 | 33% |
| OSD | 10.3 | No | yes | <<40 | <<8% |
| OSD | 10.3 | No | no | <<40 | <<8% |
| OSD | 10.0 | Yes | yes | <40 | <8% |
| OSD | 10.2 | Yes | no | 101 | 20% |

A comparison between the leaching properties of a treated residue that has been subdued to a reoxidation (SD3 and OSD3), the similar treated sample that has not been subdued to reoxidation (SD4 and OSD4), and the untreated residue show that a massive reoxidation can not be seen in the test (See table 4). For OSD no reoxidation could be observed at all. For SD reoxidation of 24% of the Cr leached from the reference was observed when the leaching test was performed aerobically. In a leaching test on a dried SD sample reoxidation of 33% is observed (see table 3).

TABLE 4

Comparison of reoxidized treated residues (SD3 and OSD3) and non-reoxidized treated residues (SD4 and OSD4). None of these were dried prior to testing. pH in the tests was between 12.5 and 12.8 for all SD residues and between 10.3 and 10.7 for all OSD residues.

| Residue | Leaching conditions | SD3/OSD3 µg/kg | SD4/OSD4 µg/kg | Reference-Untreated SD µg/kg |
|---|---|---|---|---|
| SD | −Ox | <<40 | <<40 | <<40 |
| SD | +Ox | 122 | <<40 | 500 |
| OSD | −Ox | <<40 | <<40 | <<40 |
| OSD | +Ox | <<40 | <<40 | 500 |

5. Conclusion

A treatment in which water is added to raw APC-residues under anaerobic conditions was found to immobilize Cr most likely due to oxidation of the natural occuring free metals in the residues under oxygen free conditions.

A treatment in which water and metallic Al or Fe are added to an APC-residue without a natural content of free metals under anaerobic conditions was found to immobilize Cr due to oxidation of Al(0) or Fe(0) under oxygen free conditions.

The redox reaction involved could comprise other components than the free metal and Cr, e.g. nascent H.

The leaching properties of the treated APC-residues are improved significantly. A batch leaching test indicated that leaching of Cr from treated APC-residue was very low (around or below GFAAS detection limit 2 µg/l).

A study of the stability of the treated APC-residue confirms that the immobilized Cr can not readily be reoxidized. Aeration in a suspension and/or aerobic drying (50° C.) of the treated residue reoxidized a maximum of 33% of the reduced Cr and no reoxidation could be observed if the treatment comprised an addition of Al(0).

The leaching conditions such as aerobic and anaerobic conditions have a strong effect on Cr leaching.

What is claimed is:

1. A method for reducing the leaching of oxyanion forming elements from materials containing environmentally noxious constituents, the said method comprising admixing the said materials and an aqueous medium in a closed container in a liquid-solid ratio sufficient to cause reducing conditions capable of stabilizing oxyanion forming elements due to oxidation of metallic Al, Zn, Fe, and other free metals present in the said materials.

2. A method as claimed in claim 1, in which metallic Al is added from an external source.

3. A method as claimed in claim 2, in which metallic Al is added from an external source in an amount of about 5% w/w.

4. A method as claimed in claim 1, in which metallic Zn is added from an external source.

5. A method as claimed in claim 1, in which metallic Fe is added from an external source.

6. A method as claimed in claim 5, in which metallic Fe is added from an external source in an amount of about 3% w/w.

7. A method as claimed in claim 1, in which the said residues are alkaline incineration residues.

8. A method as claimed in claim 1, in which the said residues are alkaline incineration residues from waste incineration.

9. A method as claimed in claim 1, in which the said residues are bottom ash from waste incineration.

10. A method as claimed in claim 1, in which the said residues are flue gas cleaning products from waste incineration.

11. A method as claimed in claim 1, in which the oxyanion forming element is chromium.

12. A method as claimed in claim 1, in which the oxyanion forming element is one or more from the group of: antimony, arsenic, molybdenum, selenium, and vanadium.

13. A method as claimed in claim 7, in which the said alkaline residues have a pH in the upper part of the alkaline area.

14. A method as claimed in claim 7, in which the said alkaline residues have a pH in the residue around 9–10 after the method has been applied to said residue.

15. A method as claimed in claim 1, in which the liquid-solid ratio is from about 0.7 to about 3 liter per kilogram.

16. A method as claimed in claim 1, in which the reaction time in the closed container is from 10 minutes to 24 hours.

17. A method as claimed in claim 16, in which the reaction time in the closed container is 1–3 hours.

18. A method as claimed in claim 1, in which reducing gas is added from an external source.

19. A method as claimed in claim 1, in which the said aqueous medium is water.

20. A method as claimed in claim 1 in which the materials containing environmentally noxious constituents comprise incineration residues.

21. A method as claimed in claim 10, in which the flue gas cleaning product is fly ash.

22. A method as claimed in claim 13, in which the pH in the upper part of the alkaline area is around 12.

* * * * *